INVENTOR.
Franklin L. LeBus Sr.
BY
AGENT Mildred K. Flowers

Sept. 3, 1968   F. L. LE BUS, SR   3,399,846
ANTI-HARMONIC CABLE SPOOLING METHOD AND APPARATUS THEREFOR
Filed March 23, 1966   3 Sheets-Sheet 3

INVENTOR.
Franklin L. Le Bus Sr.
BY

AGENT Mildred A. Flowers

United States Patent Office 3,399,846
Patented Sept. 3, 1968

3,399,846
ANTI-HARMONIC CABLE SPOOLING METHOD
AND APPARATUS THEREFOR
Franklin L. Le Bus, Sr., Longview, Tex., assignor to Le
Bus Royalty Company, Longview, Tex., a partnership
composed of the F. L. Le Bus Company and the G. F.
Le Bus Rotary Tool Trust
Filed Mar. 23, 1966, Ser. No. 536,816
9 Claims. (Cl. 242—117)

ABSTRACT OF THE DISCLOSURE

An anti-harmonic cable spooling method and means wherein the cable is wound on a cable spool drum in such a manner as to break up any harmonics for substantially eliminating cable whip between the cable spooling drum and the first fixed sheave. The cable is shifted laterally along the outer periphery of the drum during the winding operation in such a manner that the cable is first shifted through a distance different from the width of a cable groove, and subsequently shifted through a second distance wherein the cumulative movement of the cable is equal to the width distance between a pair of succeeding cable grooves of the parallel grooved sections.

---

This invention relates to improvements in cable spooling apparatus and more particularly, but not by way of limitation, to an improved cable spooling system for substantially eliminating any harmonic motion in the cable during a cable spooling operation.

In the spooling of multiple layers of cable or line onto a drum core, it is important to control the winding of the initial layers of cable wound on the drum to provide a true and even winding thereof in order to maintain any control whatsoever over the outer winds or layers of the cable. A counterbalanced cable spooling system for providing a true and efficient winding of multiple layers of cable on a drum core has been developed by Franklin L. Le Bus, Sr. as disclosed in various Le Bus prior art patents, such as United States Letters Patent No. 2,620,996, issued Dec. 9, 1952, entitled, "Cable Winding Apparatus"; No. 2,708,080, issued May 10, 1955, and entitled, "Hoisting Drum"; No. 2,732,150, issued Jan. 24, 1956, and entitled, "Balanced Cable Spooling." The spooling system developed by the aforementioned patents generally comprises a spooling drum provided with a continuous cable receiving groove extending around the outer periphery of the drum core. The groove comprises a plurality of alternate parallel sections and helical sections, with the most common arrangement being the provision of two helical sections and two parallel sections. The helical sections are commonly known as the pitch areas and usually are so arranged as to move the cable from one parallel section through a lateral dimension substantially equal to one-half groove and into the next succeeding parallel section. Of course, after the cable has moved through two of the pitch areas, it will be moved laterally through a dimension equal to one complete groove.

As the initial layer of cable is wound on the drum, the cable is disposed in the groove and is efficiently wound around the drum core to provide an efficient basis for the succeeding or subsequent layers to be wound thereon. During the winding of the second layer of cable, the cable is reversed in direction at the drum flange by the usual kicker members, as is well known, and the cable follows the groove provided between the wraps of the previous or first layer of cable. Of course, at each pitch area or helical section of the first layer, the second layer of cable is moving in a reverse direction, and consequently the cable rises upwardly over the helically wound portion of the first layer, and continues to wind in the parallel sections toward the opposite drum flange. These areas on the second and succeeding layers of the wound cable are known as the cross-over areas.

It will be readily apparent that the cable disposed in the cross-over areas rises higher than the cable disposed in the parallel portions, and as a considerable number of layer of cable are wound on the drum, the build up of the cable at the cross-over areas may become exceedingly great. As a consequence, a centrifugal force may be imparted during the rotation of the drum which may produce a harmonic motion along the cable. This may be undesirable, particularly when the distance between the drum and the fair lead is relatively great, since the harmonic motion usually causes a cable whip. In order to counteract the cable whip, it is necessary to utilize a damper device. This may consist of a series of floating sheaves interposed between the drum and the first fixed sheave.

The present invention contemplates a novel cable grooving system particularly designed and constructed to break up any harmonics, thereby substantially eliminating cable whip between the drum and the first fixed sheave. The grooving system is arranged for imparting different types and magnitudes of impulses to the cable, thus precluding any harmonic motion therein. The cable receiving groove provided around the outer periphery of the drum core is generally similar to that disclosed in the aforementioned Le Bus patents in that it comprises a continuous groove having alternate parallel and helical sections. However, the helical sections or pitch areas are constructed for moving the cable from one parallel groove section to the next succeeding parallel groove section in a different manner. The cable enters the cable groove at the beginning of a first parallel section and moves through the parallel section to the first pitch area. At the first pitch area, the cable is directed across the drum through a distance slightly greater than the width of one-half groove, and then moved back slightly to the distance equal to the width of one-half groove from the original position of the cable for directing the cable into the parallel groove of the next succeeding parallel section. The cable moves through the second parallel section and to the second pitch area. At the second pitch area, the cable is initially moved over through a distance slightly less than the width of one-half groove, and then is kicked an additional amount for moving of the cable through a distance equal to one-half groove for directing the cable into the second parallel groove of the first parallel section. This results in an entirely different action during the spooling of multiple layers on the drum and substantially eliminates any harmonic motion which might otherwise be imparted to the cable. In addition, it may be desirable to lower the bottom of the groove in one or all of the pitch areas in order to reduce the build up at the cross-over areas in the outer layers of cable for further reducing harmonic motion in the cable.

It is an important object of this invention to provide a novel anti-harmonic motion grooving system for cable spooling drums.

It is another object of this invention to provide a novel anti-harmonic cable spooling system wherein the groove pattern will impart different types and magnitudes of impulses to substantially eliminate cable whip between the drum and the first fixed sheave.

A further object of this invention is to provide a novel cable grooving system wherein the pitch area of the cable groove moves the cable across the drum in a manner for substantially precluding any harmonic motion during a cable spooling operation.

A still further object of this invention is to provide a novel anti-harmonic cable grooving system which is simple and efficient in operation and economical and durable in construction.

Other objects and advantageous features of the present invention will hereinafter more fully appear in connection with a detailed description of the drawings in which.

Figure 1:
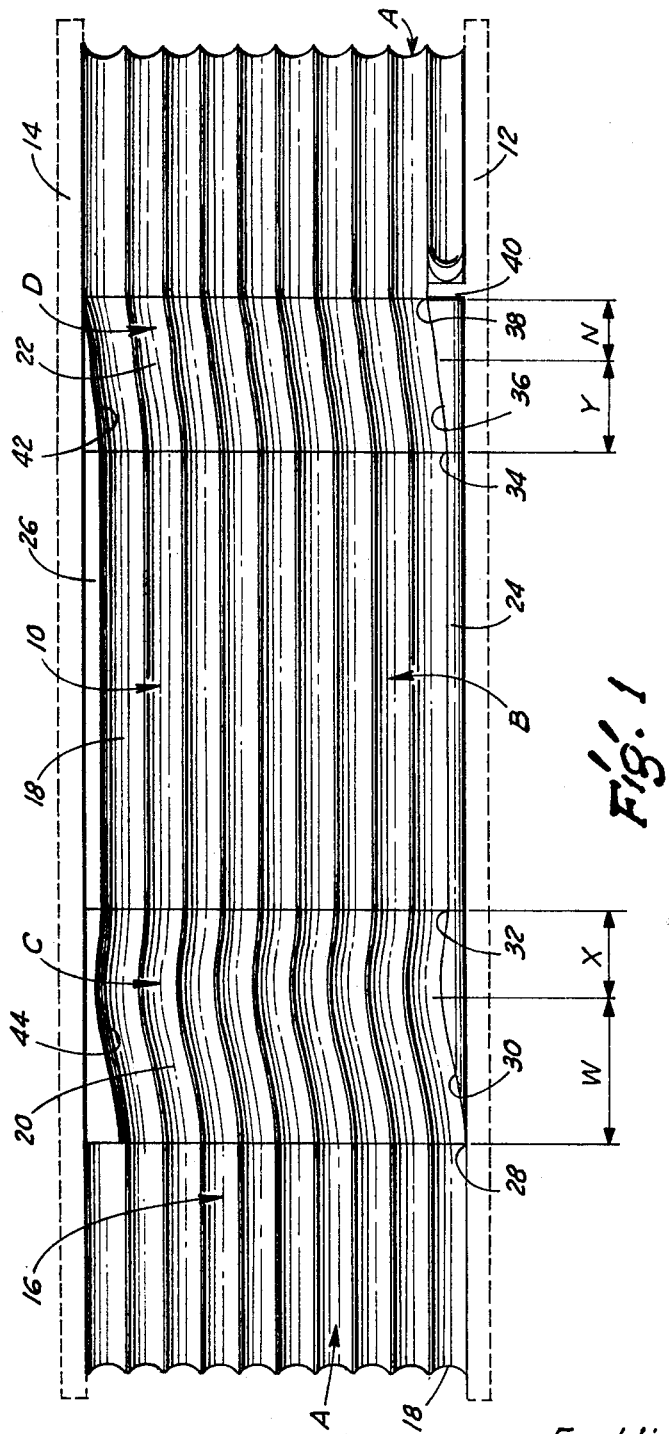
FIGURE 1 is an evolved plan view of a grooved cable spooling drum depicting a cable spooling system embodying the invention.
Figure 3:
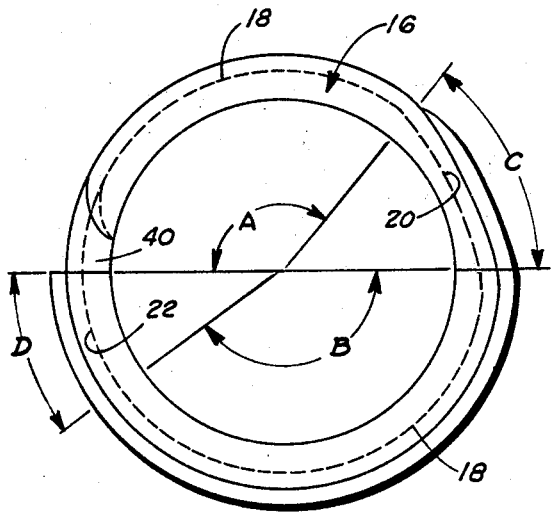
FIGURE 3 is an end view of a grooved sleeve having the grooving provided thereon as shown in FIGURE 1.

Referring to the drawings in detail and particularly FIGURES 1 and 3, reference character 10 generally indicates a cable spooling drum comprising the usual oppositely disposed drum flanges 12 and 14 having a drum core 16 interposed therebetween. The drum core 16 may be of any suitable type, and usually comprises a grooved cylindrical sleeve secured between the drum flanges 12 and 14. The drum core or sleeve 16 is provided with a plurality of parallel grooves 18 cooperating with a plurality of arcuate or curved grooves 20 and 22 on the outer periphery thereof which comprises a continuous combined parallel and curved portion groove around the sleeve 16 and extending from one of the flanges 12 to the other flange 14. As particularly shown in FIGURE 1, the parallel grooves 18 extend around the sleeve 16 in two separate sets A and B of parallel grooves, wherein groove set A is separated from set B by the two different sets of arcuate grooves 20 and 22 providing two separate control or pitch areas C and D, respectively. The parallel grooves 18 may extend around the circumference of the sleeve 16 through any variable distance in accordance with the desired grooving system for the drum 10.

Suitable oppositely disposed control bars or end fillers 24 and 26 are secured adjacent the inner face of the drum flanges 12 and 14, respectively, as is well known, for facilitating guiding of the cable into the groove during the initial winding or first layer of the cable around the sleeve 16. Referring to FIGURE 1, it will be noted that the parallel grooves 18 of set A connect with the arcuate grooves 20 of set C at a point 28 which is the start of the lesser tapered or arcuate surface 30 of the control bar 24. The arcuate grooves 20 of set C preferably connect at the opposite ends thereof at a point 32 with the parallel grooves 18 of set B. The opposite ends of the parallel grooves 18 of set B connect with the arcuate grooves 22 of the set D at a point 34 which is the beginning of a second arcuate or curved surface 36 provided on the end filler or control bar 24. The arcuate grooves 22 of set D extend into connection with the parallel grooves 18 of set A at a point 38.

The end filler 24 does not extend beyond the point 38, and an opening or slot 40 is provided in the sleeve 16 at this end of the control bar 24 for permitting entry of the cable (not shown) into the first groove of the parallel grooves 18 of set A. Of course, a suitable aperture (not shown) may be provided in the drum flange 12 and in alignment with the slot 40 for receiving the free end of the cable therein in order to fasten or secure the cable to the drum 10 at the beginning of the spooling operation, as is well known.

The end filler or control bar 26 is substantially identical to the control bar 24, but is oppositely disposed therefrom. The control bar 26 is provided with a first lesser curved or tapered surface 42 disposed within the pitch area D and oppositely disposed with respect to the tapered surface 36. A second arcuate or tapered surface 44 is provided on the control bar 26 and oppositely disposed within the pitch area C with respect to the tapered surface 30.

From an inspection of FIGURE 1 it will be apparent that the arcuate grooves 20 of set C are of a configuration for moving or directing the cable from the parallel grooves of set A into the corresponding parallel grooves of set B in such a manner that the cable is first moved over or moved along the outer periphery of the sleeve 16 through a distance slightly greater than half of the groove pitch within the distance indicated at W in FIGURE 1. The groove 20 is so formed as to move the cable in a reverse direction through the distance indicated at X to a position in alignment with the parallel groove 18 in set B which is the next succeeding groove with respect to the parallel groove 18 in set A. Since it is preferable to move the cable longitudinally through a distance equal to one-half the groove pitch, or one-half the groove width at each pitch area C and D, it will be apparent that the resultant movement of the cable through the pitch area C is equal to one-half the groove pitch, although the cable initially moves through a distance slightly greater than the one-half pitch.

The cable then continues to move through the parallel groove 18 of the set B and into the arcuate groove 22 of the pitch area D. The grooves 22 are of a configuration wherein the cable is moved along the sleeve through a distance slightly less than one-half the groove pitch through the distance indicated at Y, and then is kicked an additional amount through the distance N so that the cable has been moved through a total distance equal to one-half groove pitch. The cable will then be in alignment for moving through the next succeeding parallel groove 18 of set A.

In other words, the sets A and B are preferably arranged in such a manner that the parallel grooves 18 thereof are offset one-half pitch, or spaced one-half pitch apart, as disclosed in the aforementioned Le Bus prior art patents, and the cable is directed from one parallel groove to another in a controlled manner. However, the movement of the cable in the cable spooling system of the present invention is altered through the pitch areas in such a manner as to provide a different disposition of the cable at each pitch area C and D, thus substantially eliminating any harmonic motion in the cable during a cable spooling operation.

Referring now to FIGURE 3, the bottom of the grooves 20 of the pitch area C may be cut along a substantially straight line between the parallel sets A and B, so that the bottom of the grooves 20 deviates from a true circumference of the sleeve 16. It will thus be apparent that the cable portions lying within the pitch area C will be slightly lower than the portions of the cable disposed in the remaining grooves of the sleeve 16. As a consequence, the build up of the succeeding wraps or layer of cable will be lessened to improve the cable spooling operation.

In addition, whereas the length of the pitch areas C and D may be substantially identical, and they may be arranged in a diametrically opposed disposition, it is to be understood that the length of each pitch area C and D may be of substantially any desired dimension, and may be spaced around the circumference of the sleeve as desired. For example, FIGURES 1 and 3 disclose an embodiment wherein the pitch areas C and D are substantially diametrically opposed, but the pitch area C is of a greater length than the pitch area D.

Figure 2:
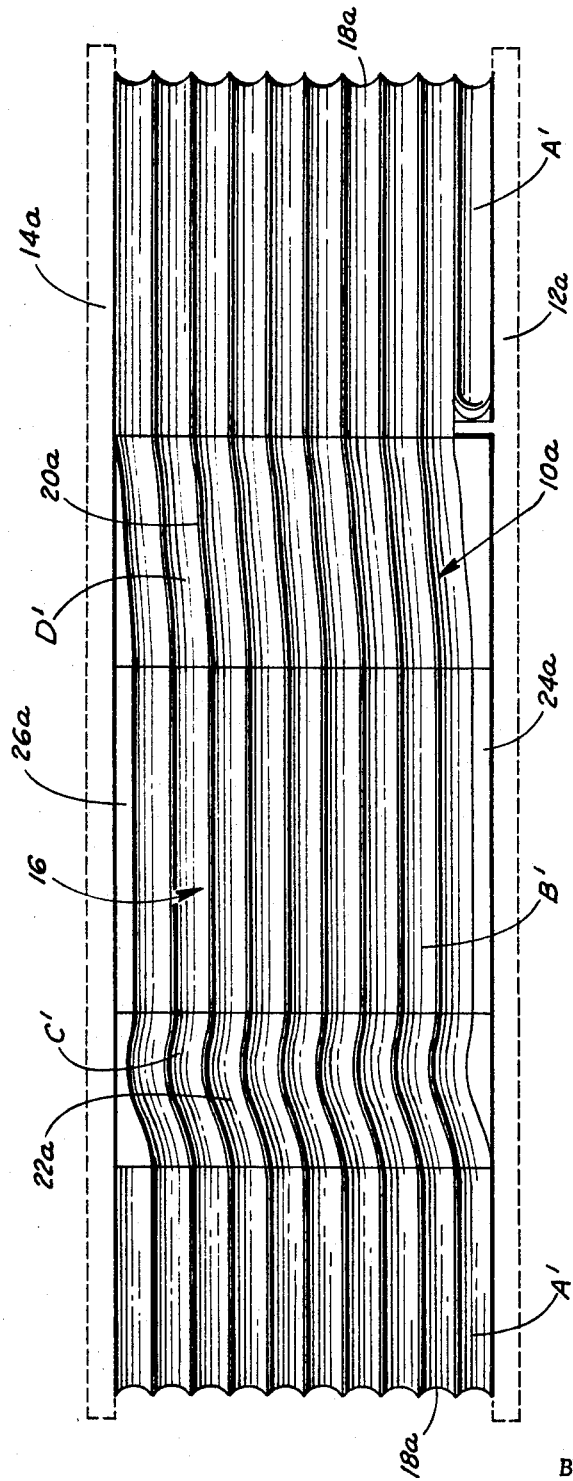
FIGURE 2 is a view similar to FIGURE 1 depicting a modified cable grooving system embodying the invention.
Figure 4:
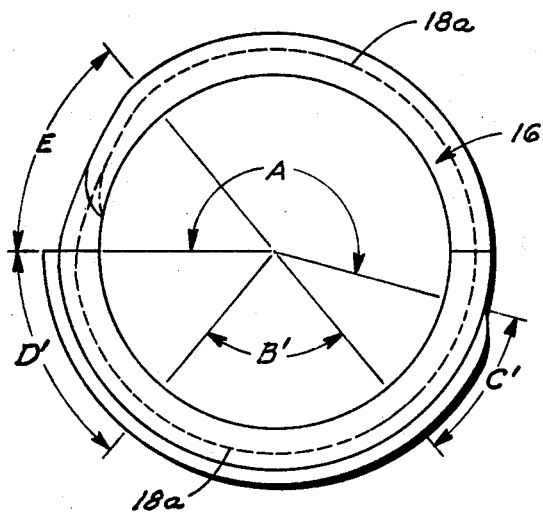
FIGURE 4 is a view similar to FIGURE 3 depicting the grooving system as shown in FIGURE 2.

Referring to FIGURES 2 and 4, a generally similar cable grooving system is shown wherein the drum 10a comprises the usual oppositely disposed drum flanges 12a and 14a having a grooved drum core or sleeve 16a interposed therebetween. The sleeve 16a is provided with a plurality of parallel grooves 18a separated into two sets A' and B' by the curved or arcuate grooves 20a and 22a of the pitch areas C' and D' respectively, as set forth in the embodiment disclosed in FIGURES 1 and 3. The usual end fillers 24a and 26a are secured to the drum flanges 12a and 14a and are generally similar to the end fillers or control bars 24 and 26 hereinbefore set forth. The pitch areas C' and D' are similar to the pitch areas C and D. However, it will be readily apparent from an inspection of FIGURES 2 and 4 that the pitch area D' is of a greater length than the pitch area C'. In addition, the pitch areas C' and D' are not diametrically opposed, and the parallel section or set A' is of a greater length than the set B'.

In addition, it will be seen from FIGURE 4 that the bottoms of the grooves 20a and 22a are circular or continue around the circumference of the sleeve 16a whereas a portion E of the parallel section or set A' is flat or straight to provide a low spot around the circumference of the sleeve 16. This illustrates that the low spot may be provided as desired around the outer periphery of the sleeve 16 for improving the overall cable spooling operation.

From the foregoing it will be apparent that the present invention provides a novel anti-harmonic cable grooving system particularly designed and constructed to preclude cable whip between the cable spooling drum and the first fixed sheave, or throughout the cable during a spooling operation. The grooving system provides a novel configuration for the pitch areas whereby a different type and magnitude of impulses will be imparted to the cable to break up the harmonics. In addition, the build-up of the cable at the cross-over area in the outer layers of the cable wound on the drum is reduced for further improving the overall cable spooling operation. The novel cable grooving system is simple and efficient in operation and economical and durable in construction.

Changes may be made in the combination and arrangement of parts as heretofore set forth in the specification and as shown in the drawings, it being understood that any modification in the precise embodiment of the invention may be made within the scope of the following claims without departing from the spirit of the invention.

What is claimed is:

1. A cable winding apparatus comprising a drum core having flanges on the opposite ends thereof, a continuous groove provided on the outer periphery of the drum core and extending between the flanges for receiving a cable therein, said continuous groove comprising alternate parallel and arcuate sections, said arcuate sections being of a configuration providing two separate cable moving portions for the arcuate sections for moving the cable from one parallel groove to another parallel groove in a two-step shifting movement, said two-step movement comprising initially moving the cable through a first distance different from the distance of the width displacing a groove of one parallel section and a corresponding groove of the other parallel section and subsequently moved through a second different distance whereby the cumulative movement of the cable along the drum core is equal to the width displacing the respective grooves of the parallel sections.

2. A cable winding apparatus as set forth in claim 1 wherein at least a portion of said continuous groove is provided with a substantially straight bottom portion for lowering the height of the cable disposed therein with respect to the height of the cable disposed in the remaining portion of the continuous groove.

3. A cable spooling apparatus comprising a cylindrical sleeve having a continuous groove provided on the outer periphery thereof for receiving a cable, said continuous groove comprising first and second sets of parallel grooves, a first set of arcuate grooves interposed between the first adjacent ends on the first and second sets of parallel grooves for directing the cable from the first set of parallel grooves to the second set of parallel grooves, a second set of arcuate grooves interposed between the second adjacent ends of the first and second sets of parallel grooves for directing the cable from the second set of parallel grooves to the first set of parallel grooves, each of said sets of arcuate grooves being of a configuration providing two separate and distinct cable shifting portions for each set of arcuate grooves for directing the cable from the grooves of one set of parallel grooves to the grooves of the other set of parallel grooves in a two-step shifting operation each of said two portions directing the cable through a distance different from the other portion.

4. A cable spooling apparatus comprising a cylindrical sleeve having a continuous groove provided on the outer periphery thereof for receiving a cable, said continuous groove comprising first and second sets of parallel grooves, a first set of arcuate grooves interposed between the first adjacent ends on the first and second sets of parallel grooves for directing the cable from the first set of parallel grooves to the second set of parallel grooves, a second set of arcuate grooves interposed between the second adjacent ends of the first and second sets of parallel grooves for directing the cable from the second set of parallel grooves to the first set of parallel grooves, each of said sets of arcuate grooves being of a configuration for directing the cable from the grooves of one set of parallel grooves to the grooves of the other set of parallel grooves in a two-step shifting operation, one of said sets of arcuate grooves having a configuration for initially directing the cable across the sleeve through a distance slightly greater than one-half groove width and subsequently directing the cable in a reverse direction across the sleeve for a cumulative movement of the cable through a distance equal to one-half groove width.

5. A cable spooling apparatus as set forth in claim 3 with one of said sets of arcuate grooves being of a configuration for initially directing the cable across the sleeve through a distance slightly less than one-half groove width and subsequently kicking the cable across the sleeve for a cumulative movement of the cable through a distance equal to one-half groove width.

6. In a cable spooling apparatus, a cylindrical sleeve having a continuous groove provided on the outer periphery thereof for receiving a cable, said continuous groove comprising first and second sets of parallel grooves, a first set of arcuate grooves interposed between the first adjacent ends of the first and second sets of parallel grooves for directing the cable from the first set of parallel grooves to the second set of parallel grooves, a second set of arcuate grooves interposed between the second adjacent ends of the first and second sets of parallel grooves for directing the cable from the second set of parallel grooves to the first set of parallel grooves, one set of said arcuate grooves having a configuration for initially directing the cable across the sleeve through a distance slightly greater than one-half groove width and subsequently directing the cable in a reverse direction across the sleeve for a cumulative movement of the cable through a distance equal to one-half groove width, and the other set of said arcuate grooves being of a configuration for initially directing the cable across the sleeve through a distance slightly less than one-half groove width and subsequently kicking the cable across the sleeve for a cumulative movement of the cable through a distance equal to one-half groove width.

7. A cable winding apparatus comprising a drum core having flanges on the opposite ends thereof, a set of circumferential grooves on the outer periphery of the drum core adapted to receive a cable, said grooves extending parallel to the flanges through a portion of the circumference of the drum core, said grooves being of an arcuate configuration through another portion of the circumference of the drum core, said arcuate grooves being of a configuration having two separate and distinct cable shifting portions for directing the cable from one parallel groove to another parallel groove in a two-step shifting movement during a cable winding operation each of said two portions directing the cable through a distance different from the other portion, and at least a portion of said continuous groove having the bottom thereof disposed lower than the remaining portions of the groove.

8. A method of spooling cable onto a drum core which consists of directing the cable initially around the drum core through a first straight groove, moving the cable along the outer periphery of the drum core through a distance slightly greater than one-half groove width, reversing the movement of the cable along the drum core for providing a cumulative movement therealong through a distance equal to one-half groove width, moving the cable around the drum core through a second straight groove, moving the cable along the outer periphery of the drum core, through a distance slightly less than one-half groove width, and subsequently kicking the cable for movement thereof along the drum core through a cumulative distance equal to one-half groove width, and repeating the sequence for winding of the cable onto the drum core.

9. A method of spooling cable onto a drum core which consists of directing the cable around a portion of the circumference of the drum core through a first straight groove, moving the cable laterally and circumferentially along the drum core through a lateral distance slightly greater than one-half groove width, moving the cable circumferentially and laterally in a reverse lateral direction for a cumulative lateral movement of the cable through a distance equal to one-half groove width, moving the cable around another portion of the circumference of the drum core through a second straight groove, moving the cable laterally and circumferentially along the drum core through a distance slightly less than one-half groove width, subsequently kicking the cable laterally for a cumulative movement equal to one-half groove width, subsequently moving the cable circumferentially around the drum core to complete one revolution and repeating the operation for spooling of the cable onto the drum core.

References Cited

UNITED STATES PATENTS 2,708,080   5/1955   Le Bus _____ 242—117

GEORGE F. MAUTZ, *Primary Examiner.*